United States Patent
Eydelman et al.

(10) Patent No.: US 8,024,476 B2
(45) Date of Patent: Sep. 20, 2011

(54) EFFICIENT MESSAGE ROUTING WHEN USING SERVER POOLS

(75) Inventors: Vadim Eydelman, Redmond, WA (US); Srikanth Shoroff, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1073 days.

(21) Appl. No.: 10/851,003

(22) Filed: May 21, 2004

(65) Prior Publication Data

US 2006/0031536 A1    Feb. 9, 2006

(51) Int. Cl.
G06F 15/173    (2006.01)

(52) U.S. Cl. ........................................ 709/238

(58) Field of Classification Search ................ 709/220, 709/223, 225, 226, 227–229, 230, 238, 242
See application file for complete search history.

(56) References Cited

U.S. PATENT DOCUMENTS

| | | | |
|---|---|---|---|
| 5,774,660 A * | 6/1998 | Brendel et al. ............. | 709/201 |
| 6,275,937 B1 | 8/2001 | Hailpern et al. | |
| 6,389,532 B1 | 5/2002 | Gupta et al. | |
| 6,434,143 B1 | 8/2002 | Donovan | |
| 6,553,422 B1 | 4/2003 | Nelson | |
| 6,567,915 B1 | 5/2003 | Guthery | |
| 6,584,567 B1 | 6/2003 | Bellwood et al. | |
| 6,601,099 B1 | 7/2003 | Corneliussen | |
| 6,865,681 B2 | 3/2005 | Nuutinen | |
| 6,963,635 B1 | 11/2005 | Jones | |
| 7,010,727 B1 | 3/2006 | Stucker | |
| 7,085,829 B2 * | 8/2006 | Wu et al. ................... | 709/223 |
| 7,142,537 B2 | 11/2006 | Shores et al. | |
| 7,146,417 B1 * | 12/2006 | Coile et al. ................. | 709/224 |
| 7,227,868 B2 * | 6/2007 | Inden ........................ | 370/395.52 |
| 7,243,370 B2 | 7/2007 | Bobde et al. | |
| 7,382,881 B2 | 6/2008 | Uusitalo et al. | |
| 7,412,521 B2 | 8/2008 | Olson et al. | |
| 7,421,732 B2 | 9/2008 | Costa-Requena et al. | |

(Continued)

FOREIGN PATENT DOCUMENTS

EP    1267548 A2    12/2002

(Continued)

OTHER PUBLICATIONS

Rosenberg, J., et al., Network Working Group, Request for Comments: 3261, SIP: Session Initiation Protocol, Jun. 2002 (270 pages).

(Continued)

*Primary Examiner* — Jeffrey Pwu
*Assistant Examiner* — Scott M Sciacca
(74) *Attorney, Agent, or Firm* — Perkins Coie LLP (57) ABSTRACT

Approaches for efficiently routing messages using a server pool are provided. In an embodiment, the system attempts to ensure high availability of servers by enabling clients to specify a domain name for the server pool even though the server pool comprises multiple servers, each having a distinct name. When a client initiates a session by using the server pool's domain name, the system may select an available server with a different name, and will route the request and subsequent messages during the session to the selected server. The system may select a server from the pool having the lowest load. The system may also indicate servers that subsequent messages in the session are to transit. Subsequent messages may then be routed to indicated servers to enable application services on the indicated servers to take actions based on the messages and the direction of the messages.

31 Claims, 7 Drawing Sheets

U.S. PATENT DOCUMENTS

| | | | |
|---|---|---|---|
| 7,535,905 B2 | 5/2009 | Narayanan et al. | |
| 2002/0010798 A1* | 1/2002 | Ben-Shaul et al. | 709/247 |
| 2002/0129236 A1 | 9/2002 | Nuutinen | |
| 2002/0141404 A1 | 10/2002 | Wengrovitz | |
| 2002/0174125 A1 | 11/2002 | Lucovsky et al. | |
| 2002/0178240 A1 | 11/2002 | Fiveash et al. | |
| 2002/0184521 A1 | 12/2002 | Lucovsky et al. | |
| 2003/0005280 A1 | 1/2003 | Bobde et al. | |
| 2003/0009570 A1 | 1/2003 | Moskowitz et al. | |
| 2003/0012149 A1* | 1/2003 | Maggenti et al. | 370/260 |
| 2003/0084331 A1 | 5/2003 | Dixon et al. | |
| 2003/0105962 A1 | 6/2003 | Le et al. | |
| 2003/0105965 A1 | 6/2003 | Challener | |
| 2003/0110257 A1* | 6/2003 | Hyun et al. | 709/224 |
| 2003/0217165 A1 | 11/2003 | Buch et al. | |
| 2004/0024881 A1* | 2/2004 | Elving et al. | 709/227 |
| 2004/0043756 A1 | 3/2004 | Haukka et al. | |
| 2004/0088424 A1 | 5/2004 | Park et al. | |
| 2004/0128554 A1 | 7/2004 | Maher et al. | |
| 2004/0205192 A1 | 10/2004 | Olson et al. | |
| 2004/0225878 A1 | 11/2004 | Costa-Requena et al. | |
| 2004/0246991 A1 | 12/2004 | Tsuzuki et al. | |
| 2004/0249911 A1* | 12/2004 | Alkhatib et al. | 709/223 |
| 2004/0258239 A1 | 12/2004 | Gallant et al. | |
| 2004/0260752 A1* | 12/2004 | Chandra et al. | 709/200 |
| 2005/0005030 A1* | 1/2005 | Asai | 709/249 |
| 2005/0033985 A1* | 2/2005 | Xu et al. | 713/201 |
| 2005/0220095 A1 | 10/2005 | Narayanan et al. | |
| 2005/0286542 A1 | 12/2005 | Shores et al. | |
| 2006/0031536 A1 | 2/2006 | Eydelman et al. | |
| 2006/0146766 A1 | 7/2006 | Nakajima et al. | |
| 2007/0291743 A1 | 12/2007 | Froment et al. | |
| 2008/0022383 A1 | 1/2008 | Bobde et al. | |
| 2008/0270618 A1 | 10/2008 | Rosenberg | |

FOREIGN PATENT DOCUMENTS

| | | |
|---|---|---|
| EP | 1583318 A2 | 10/2005 |

OTHER PUBLICATIONS

European Search Report for European Patent Application No. 05103723, Aug. 24, 2005 (3 pages).

U.S. Appl. No. 10/815,232, filed Mar. 31, 2004, Narayanan et al.

"SIP: Protocol Overview," Radvision Ltd., 2001, 16 pages.

Abdallah, H. et al., "Mobile Intelligent Network security with SIP Authentication Procedure," Information and Communication Telecommunication Technologies, Theory to Applications, 2008, ICTTA 2008, 3rd International Conference on Apr. 7-14, 2008, pp. 1-6.

Deng et al., "Defending Against Redirect Attacks in Mobile IP," 9th Conference on Computer and Communications Security, Nov. 18-22, 2002, 9 pages.

European Search Report for European Patent Application No. 05102470, Nov. 24, 2005, 3 pages.

Gordon et al., "Validating a Web Service Security Abstraction by Typing," Proceedings of the 2002 ACM Workshop on XMP-Security, Nov. 2002, 12 pages.

Jennings et al., "RFC 3325 Private Extensions to the SIP for Asserted Identity within Trusted Networks," http://www.faqs.org/rfcs/rfc3325.html, Nov. 2002, The Internet Society, 17 pages.

Jiang, X. et al., "SIP end-to-end security between Ipv4 domain and Ipv6 domain," SoutheastCon, 2005 Proceedings, IEEE, Apr. 8-10, 2005, pp. 501-506.

Leitold, F. et al., "SIP security problems in NGM Services," Next Generation Mobile Applications, Services and Technologies (NGMAST), The 2007 International Conference on Sep. 12-14, pp. 241-246.

Marshall Ed, "RFC3313 Private Session Initiation Protocol (SIP) Extensions for Media Authorization," http://www.faqs.org/rfcs/rfc3313.html, Jan. 2003, The Internet Society, 16 pages.

Partial European Search Report for European Patent Application No. 05102470, Jul. 27, 2005, 3 pages.

Salsano, S. et al., "Extending SIP authentication to exploit user credentials stored in existing authentication databases," Telecommunications and Computer Networks, SoftCOM 2008, 16th International Conference Sep. 25-27, 2008, pp. 375-379.

Salsano, S. et al., "SIP security issues: the SIP authentication procedure and its processing load," IEEE, vol. 16, Issue 6, Nov.-Dec. 2002, 8 pages.

Sisalem, D. et al., "Denial of service attacks targeting a SIP VoIP infrastructure: attack scenarios and prevention mechanisms," Network, IEEE, vol. 20, Issue 5, Sep.-Oct. 2006, pp. 26-31.

Final Office Action, U.S. Appl. No. 10/815,232, Mailed on Oct. 14, 2008, 22 pages.

Non-Final Office Action, U.S. Appl. No. 10/815,232, Mailed on Jan. 15, 2008, 27 pages.

Notice of Allowance, U.S. Appl. No. 10/815,232, Mailed on Jan. 12, 2009, 10 pages.

* cited by examiner

EFFICIENT MESSAGE ROUTING WHEN USING SERVER POOLS

TECHNICAL FIELD

The described technology relates generally to data communications and, more particularly, to methods and systems for efficiently routing messages when using server pools.

BACKGROUND

Applications sometimes need to establish and manage a session between computing devices. A session is a set of interactions between computing devices that occurs over a period of time. As an example, real-time communications applications such as MICROSOFT MESSENGER or Voice over Internet Protocol ("VoIP") establish sessions between communicating devices on behalf of a user. These applications may use various mechanisms to establish sessions, such as a "Session Initiation Protocol" ("SIP"). SIP is an application-layer control protocol that devices can use to discover one another and to establish, modify, and terminate sessions between devices. SIP is an Internet proposed standard. Its specification, "RFC 3261," is available at <http://www.ietf.org/rfc/rfc3261.txt>. A specification for extensions to SIP relating to event notifications, "RFC 3265," is available at <http://www.ietf.org/rfc/rfc3265.txt>. Both of these specifications are incorporated herein in their entirety by reference.

Applications may use SIP with another protocol to send or receive information. As an example, an application may use SIP with Real-time Transport Protocol ("RTP") for transporting real-time data during a session. By using SIP with other protocols, applications can create and manage a session and exchange information during the session. The protocol used with SIP to exchange information may segment the information into messages. Devices may also exchange SIP messages. This exchange of messages during a session is referred to as a "dialog." SIP may use lower-level communications layers to transport a dialog's messages, such as Transmission Control Protocol/Internet Protocol ("TCP/IP"), which are commonly employed transport- and network-layer protocols.

A SIP network comprises entities that can participate in a dialog as a client, server, or both. SIP supports four types of entities: user agent, proxy server, redirect server, and registrar. User agents initiate and terminate sessions by exchanging messages with other SIP entities. A user agent can be a user agent client, which is generally a device that initiates SIP requests, or a user agent server, which is a device that generally receives SIP requests and responds to such requests. As examples, "IP-telephones," personal digital assistants, and any other type of computing device may be user agents. A device can be a user agent client in one dialog and a user agent server in another, or may change roles during the dialog. A proxy server is an entity that acts as a server to clients and a client to servers. In so doing, proxy servers intercept, interpret, or forward messages between clients and servers. A redirect server accepts a SIP request and generates a response directing the client that sent the request to contact an alternate network resource. A registrar is a server that accepts registration information from SIP clients and informs a location service of the received registration information.

SIP supports two message types: requests, which are sent from a client to a server, and responses, which are sent from a server to a client, generally when responding to a request. A SIP message is comprised of three parts. The first part of a SIP message is a "start line," which includes fields to indicate a message type and a protocol version. The second part of a SIP message comprises header fields whose values are represented as name-value pairs. The third part of a SIP message is the message's body, which is used to describe the session to be initiated or contain data that relates to the session. Message bodies may appear in requests or responses.

SIP messages are routed based on the contents of their header fields. To be valid, a SIP request should contain at least the following six header fields: To, From, CSeq, Call-ID, Max-Forwards, and Via. The To header field indicates the logical identity of the recipient of the request. The From header field indicates the logical identity of the initiator of the request. The Max-Forwards header field indicates the number of hops a request can make before arriving at its destination. As an example, if a message from device A transits device B before arriving at destination device C, the message is said to have made two hops (e.g., devices B and C). The Via header field indicates the path taken by the request so far (e.g., a sequence of network addresses of devices through which the request has transited) and indicates the path that should be followed when routing the response. A header may also contain Record and Record-Route fields that are used to indicate that future requests and responses should be routed through an indicated device. Various network devices may insert Record-Route header fields when forwarding a SIP message in an attempt to force subsequent messages in a dialog to be routed through the device. The Record-Route header field may contain an identifier (e.g., network address) for the device and parameters. Devices that handle a message may force the message to be routed to devices listed in a message's Route header field. The Route header field values may be based on the Record-Route header field values inserted by devices. These and other header fields are described in the SIP specification referenced above.

A SIP server may be a single point of failure and may be unable to support large numbers of simultaneous sessions. The server could be a single point of failure because all SIP messages from or to a client may transit the server and, if the server fails, the client could be unable to participate in SIP dialogs because a location service may associate the client with the failed server. A single server may be unable to support large numbers of clients because of hardware (e.g., processor or memory) and network bandwidth limitations. In such cases, large numbers of clients can be denied server support, causing failure of the applications being performed on these clients.

An effective approach to overcome these disadvantages of SIP would have significant utility.

SUMMARY

Approaches for efficiently routing messages using a pool of servers are provided. In an embodiment, the system attempts to ensure high availability of servers by enabling clients to specify a domain name for the server pool even though the server pool comprises multiple servers, each having a distinct name. When a client initiates a session by using the server pool's domain name, the system may select an available server with a different name, and will route the request and subsequent messages during the session to the selected server. The system may select a server from the pool having the lowest load. The system may also indicate servers that subsequent messages in the session are to transit. Subsequent messages may then be routed to indicated servers to enable application services on the indicated servers to take actions based on the messages and the direction of the messages.

DETAILED DESCRIPTION

In an embodiment, a system for efficiently routing messages using a pool of servers is provided. The system attempts to ensure high availability of a server by enabling a client to specify a single fully qualified domain name ("FQDN") for the server pool even though the pool comprises multiple servers, each having a distinct FQDN. When a client initiates a SIP session by using the pool's FQDN, the system may select an available server (or "front end server") from the pool, and will route the request and subsequent messages during the session to the selected server. The selected server's FQDN may be different from the server pool's FQDN. The system may select a server from the server pool that has the lowest load. Because subsequent messages will transit the selected server, the system may attempt to route messages directly to the selected server to minimize hops to other servers. If messages are not directly routed to the selected server, and are instead routed to other intermediate servers, the overall load of servers could increase because the servers are handling traffic unnecessarily. Moreover, overall message latency could also increase because of the additional hops. To enable direct routing of messages, the system modifies headers of messages by adding the FQDN of the selected server as a parameter to a header field of the request. Devices on a network may use this parameter to route messages directly to the selected server. The system may also add the FQDN of a registration server (e.g., registrar) of the recipient of the message as a parameter to a header field. Devices on the network may use this header field to communicate with the registration server to, e.g., locate information relating to the recipient. Devices routing the messages in compliance with the SIP specification will preserve these header fields and parameters in subsequent SIP messages exchanged during the session. By evaluating these header fields and parameters, network devices are able to route messages directly to the selected server and locate information stored in a registration server associated with the recipient. In a subsequent session, or if a session needs to be re-established because the selected server is no longer available (e.g., because it has crashed), the system is able to select another server for the client. Thus, the system is able to ensure high availability of servers and balance load across servers.

In an embodiment, to ensure that applications running on servers along the path of a message can correctly process transiting messages, the servers may add a flag to the message's header indicating a role for a server. As an example, a server on the path may record billing information relating to messages sent or received by a user. To ensure that the application notices all message traffic and is able to take appropriate action based on its role, the system adds a To/From flag to a message header field. By determining from the header field whether the server's role is to handle messages from or to the original sender of the session creation request, the application is able to take appropriate action without performing expensive database lookups to determine the server's role. Using parameters in a header field to indicate a server's role also enables the system to limit the servers that take application-related actions on messages. When this information appears as parameters of Record-Route header fields, SIP-complaint devices not controlled by the system will return the information. As a result of adding header fields and parameters that travel with the message, database or other lookups are avoided and messages are correctly processed.

In an embodiment, the system uses domain and device names that are not fully qualified. As examples, the system may use relative domain names or machine names. The system may be able to resolve or use these domain and device names to uniquely identify a server pool or device.

Figure 1:
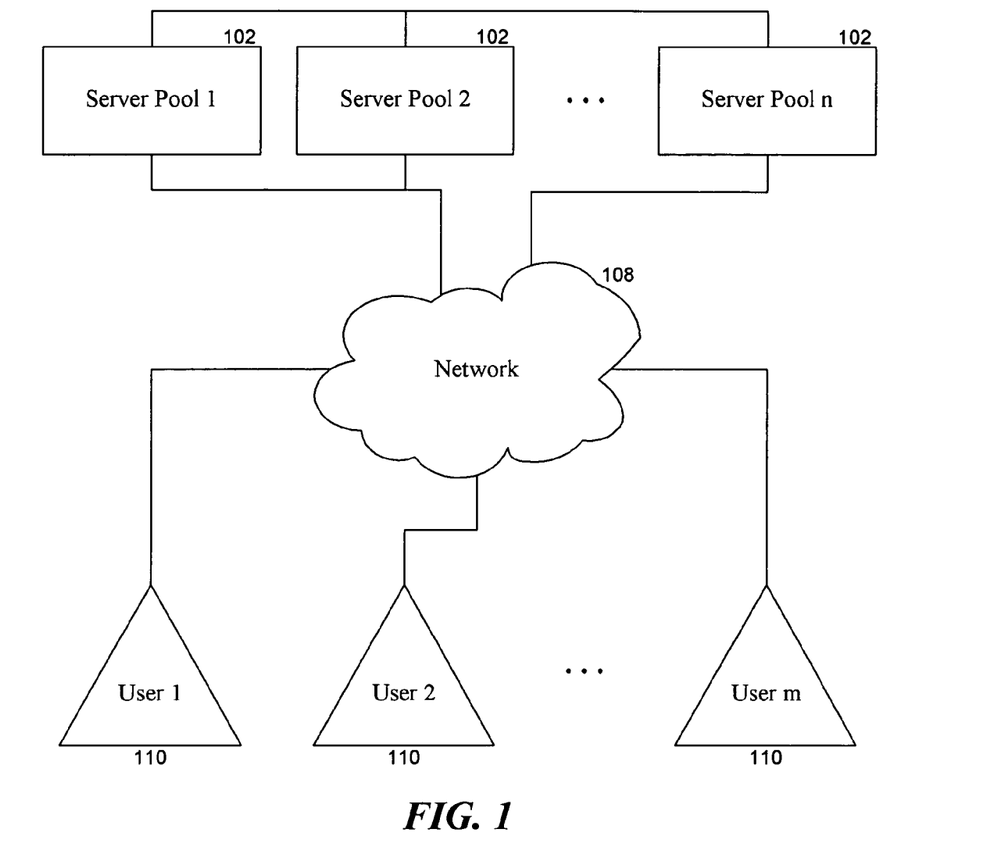
FIG. 1 is a block diagram illustrating an embodiment of a system for efficient message routing when using server pools.

Turning now to the figures, FIG. 1 is a block diagram illustrating an embodiment of a system for efficient message routing when using server pools. The system comprises at least one server pool 102. The system may include additional server pools, which may be connected to one or more other server pools. In an embodiment, the server pools may be hosted in different interconnected domains. As an example, one server pool may be hosted in "A.com" and a second server pool may be hosted in domain "B.org." "A.com" and "B.org" are characterized as second-level domains, while ".com" and ".org" are characterized as first-level domains. Server pools may also be identified by lower-level domains, such as "X.A.com" and "N.Y.B.org," which are third- and fourth-level domains, respectively.

The server pools of the system may be coupled to a network 108. The network may be an intranet, Internet, or any other type of network. The network may also be coupled to one or more user devices 110. These user devices may use the network to exchange messages with a server pool.

Figure 2:
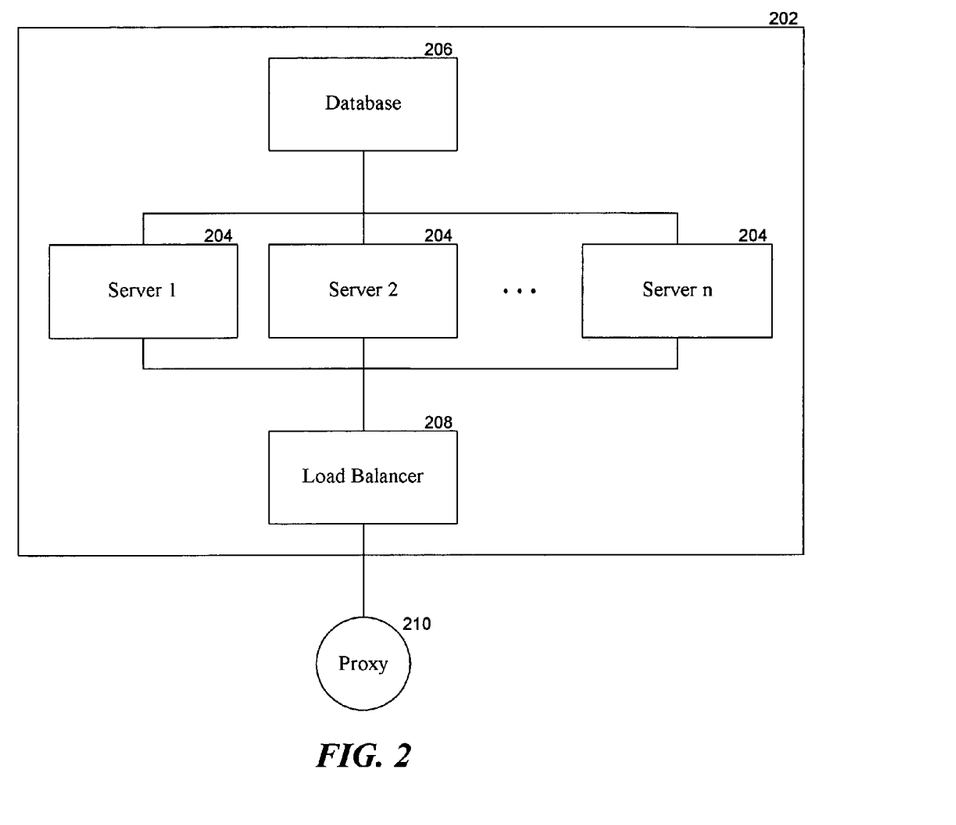
FIG. 2 is a block diagram illustrating an embodiment of a server pool of FIG. 1.

FIG. 2 is a block diagram illustrating an embodiment of a server pool of FIG. 1. The server pool 202 comprises multiple servers 204, also referred to as "front end servers." The servers may be identified by a machine name relative to the domain name of their server pool. As an example, if a server named server1 is a member of a server pool with a domain named "X.A.com," the server may be identified by its FQDN, "server1.X.A.com." The servers may be coupled to one another to form a network of servers.

The servers may also be coupled to other network resources, such as a database server 206. In an embodiment, each server 204 has its own database. Alternatively, the servers may use a database located at the database server. The database may reside either in a computing device separate from the server or in the same computing device as the server. The database may be used to store information relating to sessions. As an example, the database may be used to store a server's role for each session the server is handling.

The servers 204 may also be coupled to a load balancer 208. When a session creation request arrives at a load balancer, the load balancer may select a server from the server pool that will handle the request based on, e.g., the load on each server. As an example, if a server pool has three servers, and a server is down for maintenance, and one of the remaining two servers has high processor or network utilization, the load balancer may select the third server.

The server pool may be coupled to a proxy server 210. The proxy server takes various actions on messages it handles including, e.g., interpreting or modifying headers, forwarding the messages, and removing the messages from the network. The proxy server may have multiple network interfaces. One interface may be coupled to the Internet and another interface may be coupled to the server pool. When a server pool makes use of a proxy server, all traffic between clients and the server pool may transit the proxy server. Incoming request messages may first be handled by a proxy server, which validates routing information appearing in header fields of the request messages. The messages may then be forwarded to an enterprise services component, if one is present in the system (not shown), and then to other applications (not shown). These components may be performed by a server in a server pool.

Incoming response messages may also first be handled by a proxy server to validate routing information. The response messages may then be forwarded to applications (in reverse order as compared to request message handling), and then to the enterprise services component, if one is present. The proxy server may then update routing information before forwarding the response message.

Figure 3:
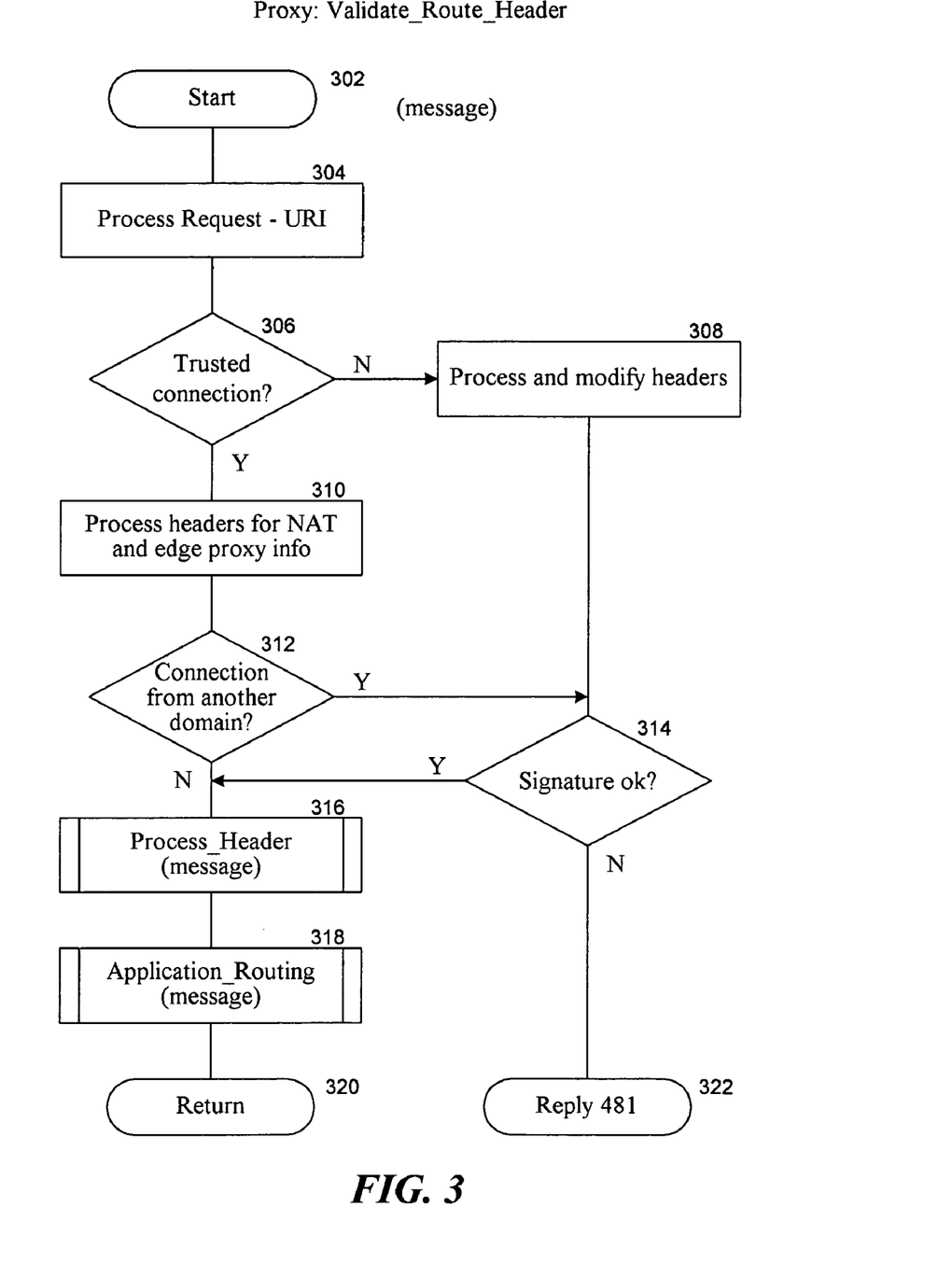
FIG. 3 is a flow diagram illustrating an embodiment of a routine performed by a proxy server for validating a request message header.

FIG. 3 is a flow diagram illustrating an embodiment of a routine for validating a header of a request message. The routine is performed by a proxy server and begins at block 302, where it receives a message as a parameter. At block 304, the routine processes a Request-URI indicated in the message. A Request-URI is a uniform resource identifier ("URI") identified as the recipient of a request message. As examples, a request message may identify a user or a device in a Request-URI. A Request-URI may have a "maddr" parameter. A maddr parameter may be associated with a URI to indicate a server address to use rather than a server address indicated by the URI's header field. As an example, while a URI may indicate a server used by a user agent, a maddr parameter for the URI may indicate a proxy server to use to contact the user. The routine processes the Request-URI by checking whether a maddr parameter in the Request-URI indicates the FQDN of the server pool to which the proxy server is coupled or an IP address on which the proxy server listens for connection requests. If that is the case, the routine removes the maddr parameter in compliance with RFC 3261. The routine then checks whether the Request-URI indicates the FQDN of the server pool to which the proxy server is coupled and whether a Route header field also contains the FQDN. If that is the case, the routine makes the Request-URI the first Route header field and makes the value contained in the last Route header field as the Request-URI.

At block 306, the routine determines whether the message arrived on a connection that is trusted. As examples, a connection is trusted when the connection uses Transport Layer Security ("TLS") and the system has verified that the entity sending the message has a TLS certificate or alternatively that the connection has been marked by an administrator of the system as being trusted. TLS uses certificates to enable private digital communications between devices. The technique may use any technology to enable private communications including, e.g., Kerberos, Advanced Encryption Standard, or Data Encryption Standard. If the connection is trusted, the routine continues at block 310. Otherwise, the routine continues at block 308.

At block 308, the routine may process and modify some header fields. As an example, the routine may remove Record-Route header fields and header fields indicating the fully qualified domain name of an edge proxy. An edge proxy is a proxy server that straddles an intranet and the Internet (e.g., in a "demilitarized zone" or "DMZ") such that a device on the Internet side of the edge proxy communicates with devices on the intranet only through the edge proxy. The system removes these header fields because it does not trust their validity as the connection was not trusted. If the proxy server does not remove the header fields, subsequent servers may erroneously trust the headers. When a connection cannot be trusted, the proxy server expects direct connections from clients, in which case, these header fields could not be present. When a client connects through another proxy, the connection would be trusted because the other proxy would be able to validate itself via TLS (or would have some other indication of a trusted connection). While processing the header fields, the routine may also determine whether the Request-URI is signed. If the Request-URI is not signed, the system may not be able to trust parameters indicating server roles or identifiers of specific servers in the server pool for the same reasons as indicated above, and so removes these parameters. The routine also validates Contact header fields by determining whether an IP address indicated for a contact in the message is the same IP address as that of the device sending the message. A Contact header field in a message contains a URI at which the sender of the message will receive requests.

At block 310, the routine determines whether the topmost Route header field has a "maddr" parameter whose value matches the IP address in the topmost Via header field. If the header field has a maddr parameter but the IP address indicated in the header field does not match the IP address of the entity sending the message, the routine replaces the IP address and port parameters relating to the FQDN identified in the header field with the IP address and port of the sender. The routine also adds a Received-CID URI parameter (e.g., to INVITE messages that initiate a dialog) to ensure that subsequent messages in the dialog will be sent through the correct connection. The Received-CID parameter may contain a unique number that is used to prevent a client from connecting to a dialog it did not previously participate in. As an example, if a client does not properly disconnect from a server and a new client connects to the same port of the server, the new client may be able to continue the dialog. However, the new client would not possess a correct Received-CID parameter because the server would not add it to a message. The incorrect Received-CID parameter would be an indication to the server that the new client does not belong to the dialog. If an edge proxy's FQDN (or that of a Network Address Translator) is indicated in a header field, the routine saves the FQDN and removes that header field to prevent it from traveling with the message into the server pool.

At block 312, the routine determines whether the connection in which the message was received is with a federated domain. A federated domain is a trusted domain other than the domain in which the proxy server operates. The routine may evaluate whether the connection is with a federated domain when the server performing the routine is an edge proxy. If the message is from a federated domain, the routine continues at block 314. Otherwise, the routine continues at block 316.

At block 314, the routine determines whether the Route header fields and Request-URI of the message have been digitally signed. If these fields have been digitally signed with a valid signature, the routine continues at block 316. Otherwise, the routine determines whether there are no Route header fields and whether the Request-URI is not digitally signed. If that is the case, the routine removes parameters in header fields indicating the server's role and continues at block 316. Otherwise, the routine continues at block 322. At block 322, the routine returns a response containing response code 481, which indicates that the user agent server has received a request that does not match an existing transaction (e.g., session). When a user agent client receives such a response, it may react by attempting to re-establish a session.

At block 316, the routine calls a Process_Header subroutine and at block 318, the routine calls an Application_Routing subroutine. These subroutines are described below in further detail in relation to FIGS. 4 and 5, respectively. The routine returns to its caller at block 320.

Figure 4:
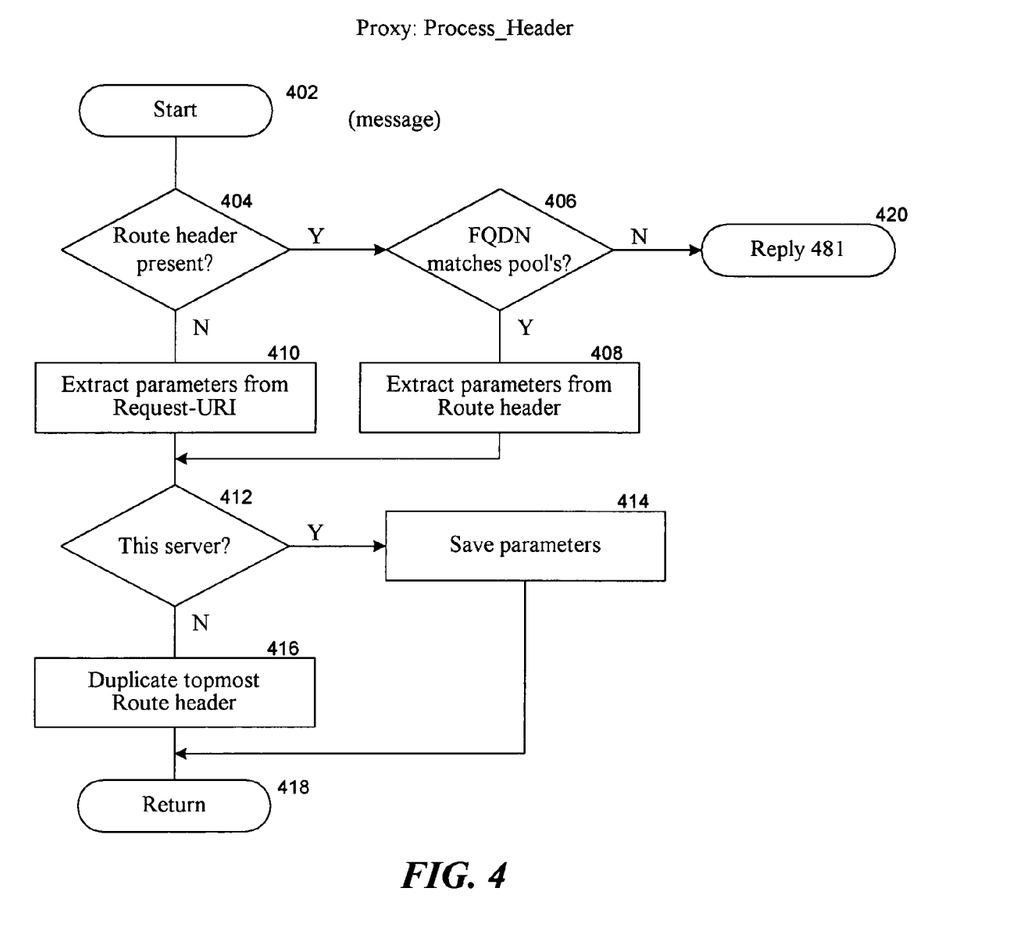
FIG. 4 is a flow diagram illustrating an embodiment of a routine performed by a proxy server for processing a request message header.

FIG. 4 is a flow diagram illustrating an embodiment of a routine performed by a proxy server for processing a request message header. The routine begins at block 402 where it receives a message as a parameter. At block 404, the routine determines whether there are Route header fields in the message. If a Route header field is found, the routine continues at block 406. Otherwise, the routine continues at block 410.

At block 406, the routine determines whether the FQDN in the topmost Route header field matches the FQDN of the server pool to which the server belongs. If the FQDNs match, the routine continues at block 408. Otherwise, the routine continues at block 420. At block 408, the routine extracts parameters from a Route header indicating the role of the server and an identification of the server to which the message will be routed.

At block 410, the routine extracts the server's role and an identification of the server to which the message will be routed from a Request-URI. These parameters may have been added to the Request-URI by an entity when that entity determined the role the proxy server processing the header will play. At block 412, the routine determines whether the parameter identifying the destination server indicates a server other than the server performing the routine. If that is the case, the routine continues at block 414. Otherwise, the routine continues at block 416. At block 414, if a parameter indicating the server's role was extracted, the role is stored in such a way that an application doing additional processing can retrieve information relating to the role, e.g., in a database coupled to the server. At block 416, the routine duplicates the topmost Route header such that it appears to have been inserted by the entity that sent the message to the server on which the routine is being performed. At block 420, the routine responds with a response code of 481, which indicates that the user agent server that received the request does not have a corresponding transaction (e.g., session). At block 418, the routine returns to its caller.

Figure 5:
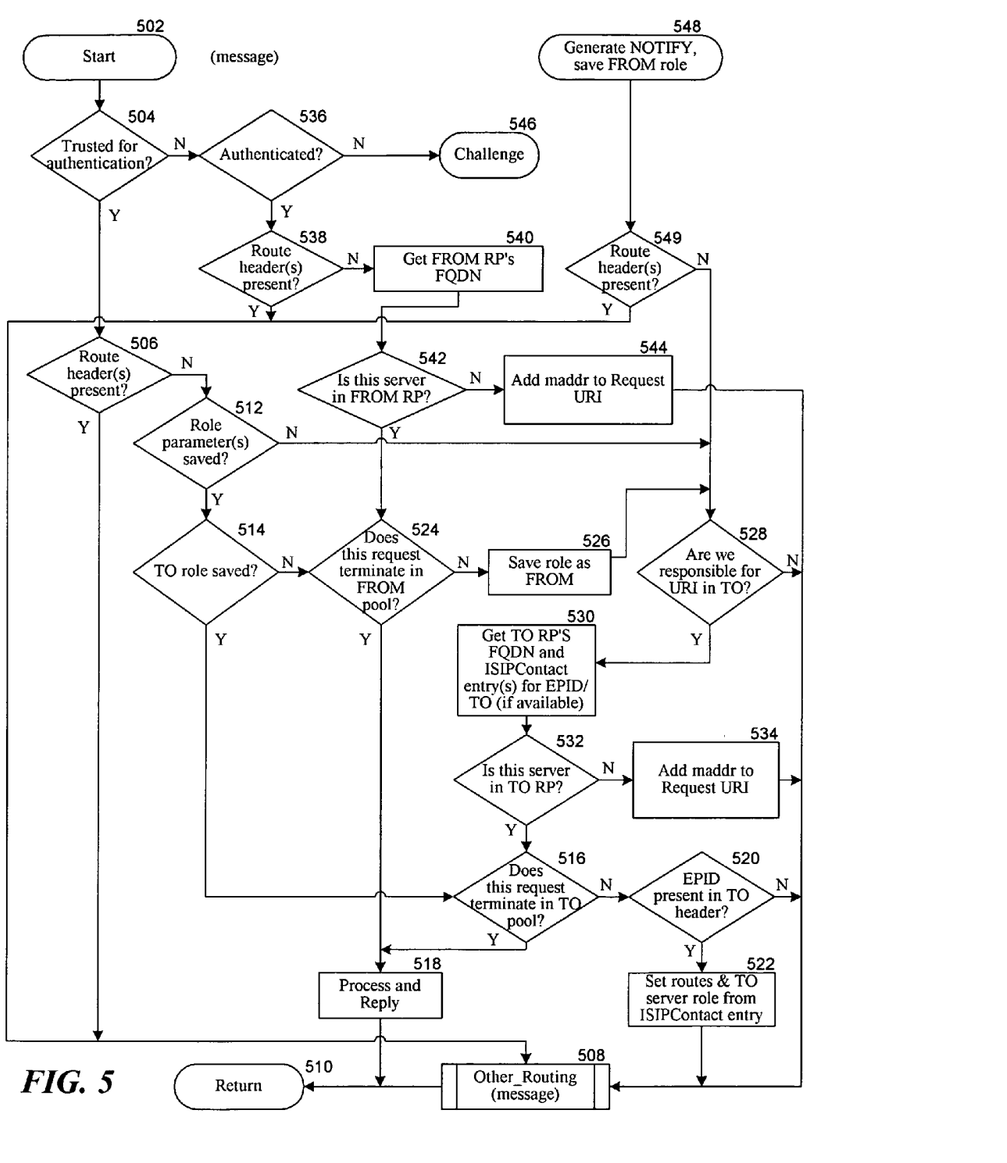
FIG. 5 is a flow diagram illustrating an embodiment of a routine performed by an enterprise services component of the system for processing a request message.

FIG. 5 is a flow diagram illustrating an embodiment of a routine performed by an enterprise services component of the system for processing a request message. An enterprise services component provides logic that can be used by an application to perform special processing based on messages. The component may perform processing (e.g., collect billing information relating to messages sent or received) based on whether it is a "To" server or a "From" server. A "To" server is a server in a server pool of the destination of the original session creation request. Conversely, a "From" server is a server in a server pool of the sender of the original session creation request. Whether a server is a "From" or "To" server is referred to as its "role."

The routine may begin at block 548 when a server generates a NOTIFY message, or at block 502 in any other circumstance (e.g., when it processes a message). When a server generates a NOTIFY message, the routine begins performing at block 548. In such a case, the server's role may be implicitly set to "From." A NOTIFY message is a message from a user agent to another indicating the state of a resource. At block 549, the routine determines whether the generated NOTIFY message already has Route headers. The server may have retrieved Route headers from a database and placed them in the generated NOTIFY message. If the NOTIFY message already has Route headers, the routine continues at block 508. Otherwise, the routine continues at block 528.

The routine may begin at block 502 where it receives a message as a parameter. At block 504, the routine determines whether the message is trusted for authentication. A message is trusted for authentication when it arrives on a TLS connection from another server in the same domain as the server performing the routine, on a TLS connection from an edge proxy that indicates the message is trusted, or in a connection marked as trusted by an administrator. As indicated above, the technique can be used with any technology that enables private communications. If the message is trusted for authentication, the routine continues at block 506. Otherwise, the routine continues at block 536.

At block 506, the routine determines whether Route headers are present in the message. The presence of Route header fields in the message indicates that a server has already indicated a next hop for the message or that the message is a part of an existing session for which a route (e.g., a sequence of hops) has already been established by prior messages, and so the server does not need to determine the next hop. In an embodiment, the server may also verify that it is not responsible for the URI indicated in the header of the message. If Route headers are present, the routine continues at block 508. Otherwise, the routine continues at block 512. At block 508, the routine calls an Other_Routing subroutine, which is further described below in relation to FIG. 6. At block 510, the routine returns to its caller.

At block 512, the routine determines whether role parameters were previously saved (e.g., by the proxy server, previous server handling the message, or by routing a prior message in the session). When such a parameter was previously saved, it is an indication to the routine that the server's role has previously been determined. If that is the case, the routine continues at block 514. Otherwise, the routine continues at block 528.

At block 514, the routine determines whether the server's role is "To." If that is the case, the routine continues at block 516. Otherwise, the routine continues at block 524. At block 516, the routine determines whether the request's destination is a server of a "To" server pool. If that is the case, the routine continues at block 518. Otherwise, the routine continues at block 520. At block 518, the routine processes the request and may send a response.

At block 520, the routine determines whether a parameter indicating an endpoint identifier ("EPID") is present in a header field of the message. An EPID can be used to distinguish multiple logins relating to a user (e.g., one from a desktop computing device and another from a cellular telephone). The presence of an EPID parameter indicates that an end point of the "To" server pool has already been selected because it is the "To" server that first adds an EPID parameter to messages, and this parameter is preserved in subsequent messages. If an EPID parameter is present, the routine continues at block 522. Otherwise, the routine continues at block 508. At block 522, the routine inserts Route headers in the message indicating that the next server is a "To" server. The server may also set its role to "To" unless the message will be routed to another server in the pool, in which case the server will add a parameter to the topmost Route header field to point to another server in the server pool.

At block 524, the routine determines whether the destination for the request is a "From" server. If that is the case, the routine continues at block 518. Otherwise, the routine continues at block 526. At block 526, the routine saves an indication that the server's role is "From." At block 528, the routine determines whether the server is in the domain of the "To" server pool. If that is the case, the routine continues at block 530. Otherwise, the routine continues at block 508.

At block 530, the routine retrieves the FQDN of the "To" server pool. At block 532, the routine determines whether the server performing the routine is a member of the "To" server pool. If that is the case, the routine continues at block 516. Otherwise, the routine continues at block 534. At block 534, the routine adds the FQDN of the "To" server pool to the message's Request-URI with a parameter indicating that the next server is a "To" server. As a result, when the Request-URI is subsequently processed by a proxy server, the message will be sent to a server in the "To" server pool.

At block 536, the routine determines whether the message was authenticated. If the message was authenticated, the routine continues at block 538. Otherwise, the routine continues at block 546. At block 546, the routine requests the proxy server to challenge the message.

At block 538, the routine determines whether there are Route headers in the message, which indicates that the message is part of a dialog in an existing session. If that is the case, the routine continues at block 508. Otherwise, the routine continues at block 540.

At block 540, the routine retrieves the FQDN of the "From" server pool. At block 542, the routine determines whether the server performing the routine is a member of the "From" server pool. If that is the case, the routine continues at block 524. Otherwise, the routine continues at block 544. At block 544, the routine adds the FQDN of the "From" server pool to the Request-URI in the message's headers with a parameter indicating that the next server is a "From" server. When the Request-URI is subsequently processed by a proxy, the message will be sent to a server in the "From" server pool.

Figure 6:
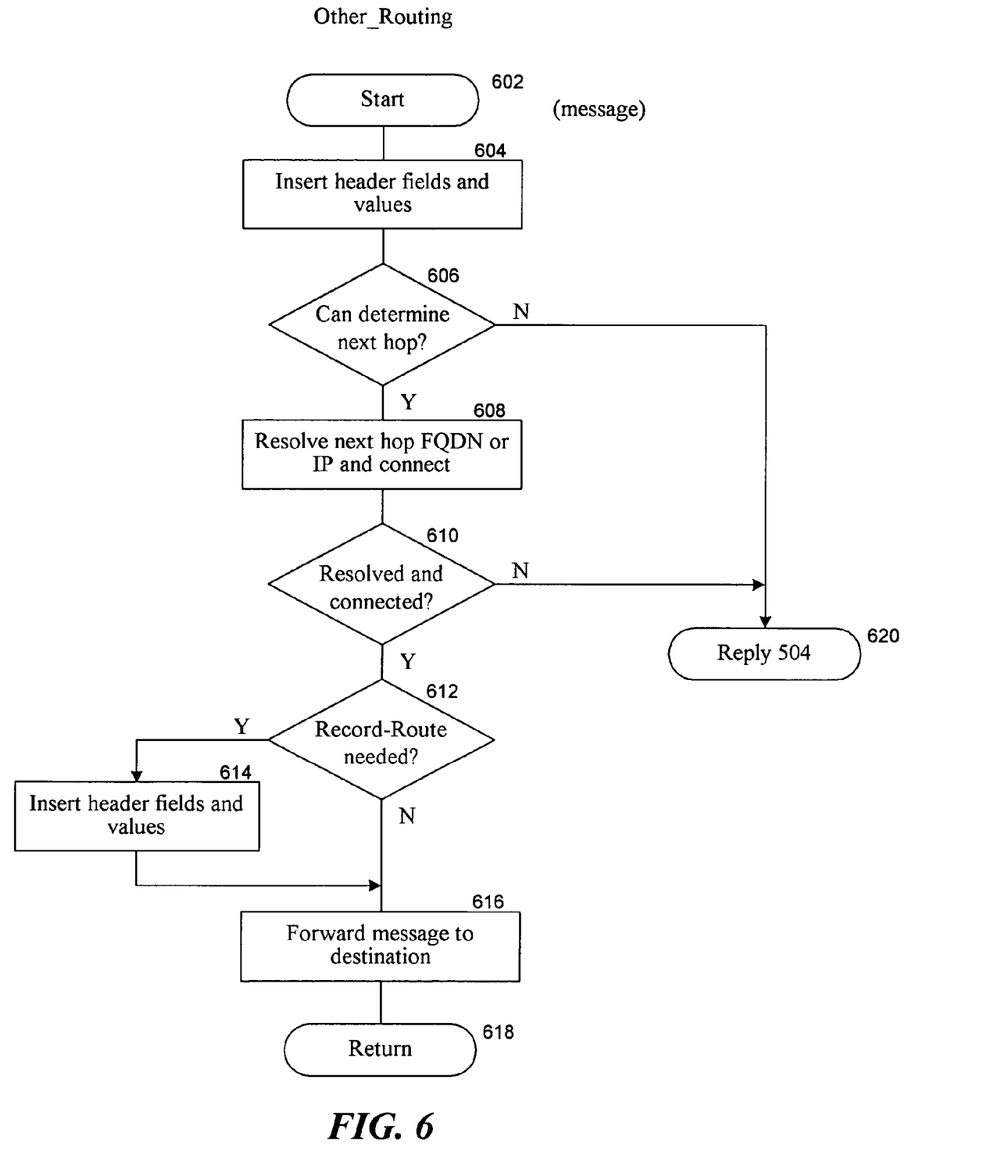
FIG. 6 is a flow diagram illustrating an embodiment of a routine for processing a request message header to enable application-related routing.

FIG. 6 is a flow diagram illustrating an embodiment of a routine for processing a request message header to enable application-related routing. The routine begins at block 602 where it receives a message as a parameter. At block 604, the routine inserts header fields and related values into the message. As an example, the routine may request a proxy to insert route headers. In such a case, the proxy may also set the role of the server. Applications running on the server performing the routine may add additional Record-Route header fields. As an example, an archiving application may add a Record-Route header field to a message to indicate that the message has been archived. Upon receiving the message again (or perhaps when an application executing on another server the message transits receives the message), the application could determine that the message was previously archived because the field has already been added.

At block 606, the routine evaluates whether the next hop for the message can be determined from the header of the message. If there is a Route header field indicating a destination, the routine determines the FQDN or IP address for the next hop from the Route header. Otherwise, if a server of the server pool is identified in the Request-URI and the message is trusted for routing, the indicated server is used as the next hop. If that is not the case, and the Request-URI matches a pattern in a static routing table associated with the server, the next hop is retrieved from the static routing table. The message is trusted for routing when it is received in a trusted connection or its Request-URI was modified by an application installed on the server, or the routing information is digitally signed. If the message is trusted for routing, the routine identifies the host portion of the Request-URI in the message's header as the next hop. If the next hop cannot be determined, the routine continues at block 620. Otherwise, at block 608, the routine resolves the FQDN or IP number of the determined next hop, and connects to the identified entity (or uses an already-open connection).

At block 610, the routine determines whether the FQDN could be resolved and a connection is open. If that is the case, the routine continues at block 612. Otherwise, the routine continues at block 620. At block 612, the routine determines whether the request was generated locally and whether a Record-Route is needed. A Record-Route is needed on edge proxies, forwarding proxies, when a server role parameter is saved, and in some other circumstances. A Record-Route is not needed for messages that do not initiate a dialog, such as NOTIFY, MESSAGE, INFO, and SERVICE message types. If the message was not generated locally or a Record-Route is needed, the routine continues at block 614. Otherwise, the routine continues at block 616.

At block 614, the routine may add header fields or parameters to the message. Which headers and parameters are added may depend on whether the connection in which the message will be sent is marked as "one-way." An administrator may enable a device for only one-way connections (e.g., the device cannot accept connection requests from other devices) to, e.g., make the device more secure. When a connection is marked as "one-way," the routine may add to a Record-Route header field of the message the server's FQDN, and port and IP address information, which enable the recipient of the message to use the connection established by the device for the session when returning a message. If the connection is not marked as one-way and the device performing the routine is a server of a server pool, the routine adds the server pool's FQDN to a Record-Route header field with a parameter identifying the server (e.g., the server's own FQDN or simply the server's name relative to the domain). When a subsequent message is received by the system in the session, the system could determine to which server to route the subsequent message based on the parameter. When the connection is not marked as one-way and the device performing the routine is not in a server pool, the routine determines whether the device is an edge proxy and the request message being evaluated originated at a client or forwarding proxy. If that is the case, the routine may add header fields and parameters similar to those added when the connection is marked as one-way so that subsequent messages are routed through the same edge proxy. Otherwise, the routine may add the server's FQDN to a Record-Route header field. If the device is an edge proxy, the device may add a FQDN that can be resolved by the device to which the message will be forwarded (i.e., a FQDN that can be resolved inside or outside an intranet depending on whether the next server is inside or outside the intranet). After adding these header fields, the routine may additionally add a parameter reversing the server's role (e.g., From to To or vice versa) if the opposite parameter was previously stored.

At block 616, the routine forwards the message. Before forwarding the message, the routine determines whether the connection on which the message will be sent is trusted for routing. As examples, connections using TLS (or some other mechanism enabling private communication) or explicitly indicated to be trusted by an administrator are trusted for routing. If the connection is trusted for routing and the process is being performed by an edge proxy, the routine determines whether the connection is with a federated domain. A federated domain is a trusted domain other than the server's domain. If the connection is not trusted or the connection is with a federated domain, the routine digitally signs any Contact and Record-Route header fields in the message and places signatures in the topmost Record-Route header field. Via headers are also digitally signed. The routine then forwards the message. At block 618, the routine returns to its caller. At block 620, the routine responds with a 504 response code, which indicates that the server did not receive a timely response when attempting to process the request.

Figure 7:
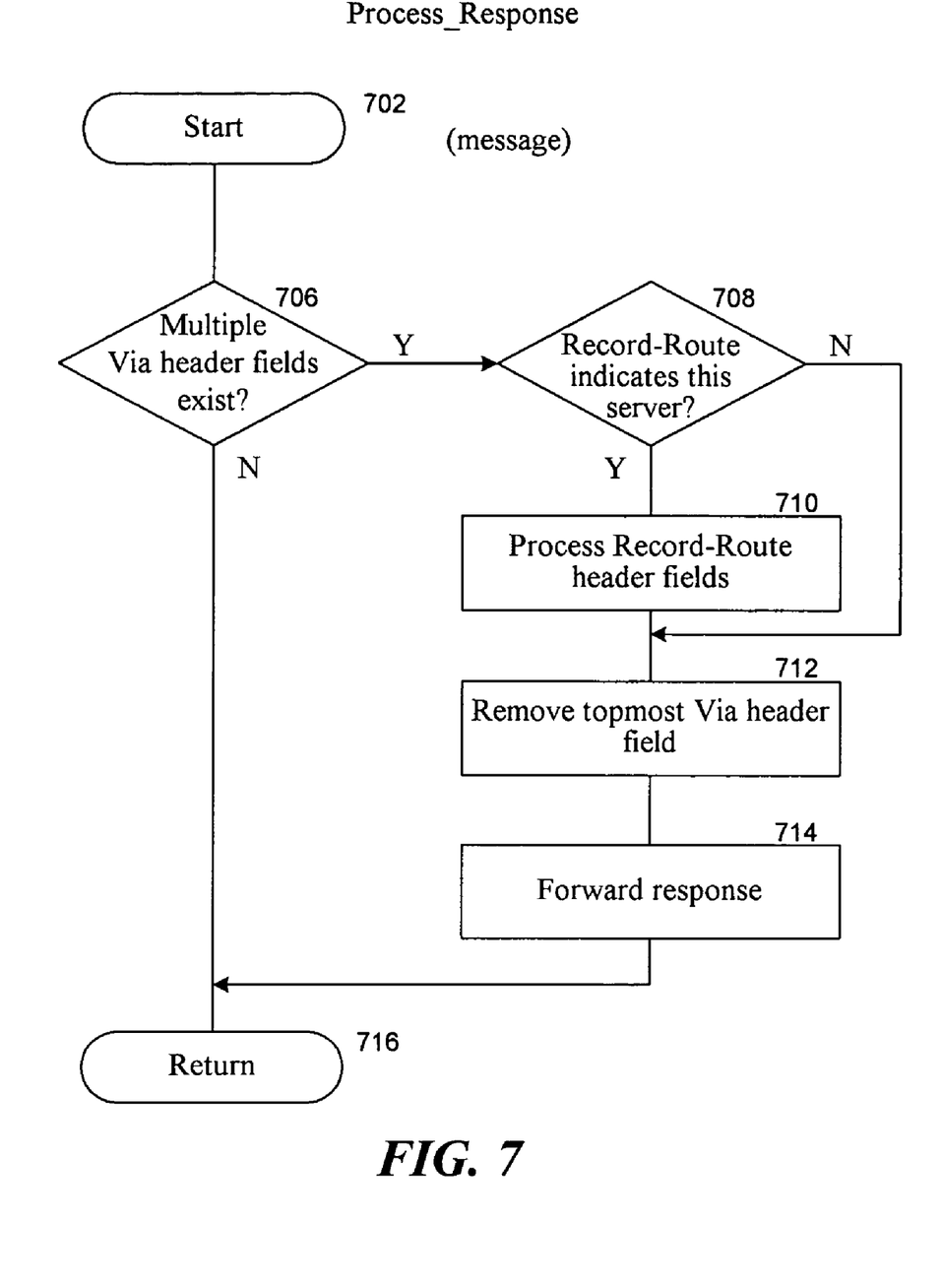
FIG. 7 is a flow diagram illustrating an embodiment of a routine for processing a response message.

FIG. 7 is a flow diagram illustrating an embodiment of a routine for processing a response message. The routine begins at block 702 where it receives a response message as a parameter. At block 706, the routine determines whether the message contains more than one Via header field. If a message contains more than one Via message field, it is an indication that the response may need to be forwarded to another server. If that is the case, the routine continues at block 708. Otherwise, the routine consumes the response locally and continues at block 716.

At block 708, the routine determines whether the connection in which the message was received is trusted for routing. Circumstances in which a connection are trusted for routine are described above, e.g., in relation to FIG. 6. If the connection is trusted for routing, the routine saves the FQDN of the edge proxy when a header field indicates such a value, and drops the header field. Otherwise, the routine processes Contact header fields of the response message by validating that these fields indicate the same IP address as the entity to which the server is connected (or proxy) and adding the Received-CID URI parameter in an attempt to ensure that another client having a session with the server performing the routine does not use the same IP address and port. If the connection is trusted for routing and the routine is being performed by an edge proxy, the routine determines whether the connection is to a federated domain. If the connection is to a federated domain, or after processing Contact header fields, the routine verifies that routing information in the message matches the signature in Record-Route and Via header fields. If the connection was not from a federated domain or the routing signatures are verified, the routine enables applications and enterprise services to process the response. If the routing signatures were not verified (e.g., because the headers were not properly digitally signed), the routine cancels the response. The routine determines whether the server performing this routine inserted a Record-Route header field into a prior request by analyzing the header fields of the response. If that is the case, the routine continues at block 710. Otherwise, the routine continues at block 712.

At block 710, the routine processes Record-Route header fields. The routine removes Record-Route header fields, if any, indicating the server performing the routine if there is no Contact header in the response. The routine may also remove other related header fields that it or another proxy may have inserted when processing the prior request that resulted in the present response. The routine may also add parameters to headers indicating the role of the server (or use values of removed parameters) so that the role can be identified or used when the sender of the prior request sends a subsequent request. The routine checks whether an administrator marked the connection as one-way. A one-way connection is an indication that other devices in the network cannot resolve the FQDN of the server or establish a connection back to the server. As an example, an administrator may desire to make a server a firewall, which enables outgoing connections but no incoming connections. If the connection is marked as one-way, the routine may add the server's FQDN, IP address, and port information to a Record-Route header field of the response. The routine may also use a forward-point parameter from a prior hop's Via header field to handle issues relating to transiting network address translators.

If the connection is not marked as one-way and the device performing the routine is a server of a server pool, the routine adds the server pool's FQDN to a Record-Route header field with a parameter indicating the server's FQDN. When a subsequent message is received by the system in the session, the system could determine to which server to route the subsequent message based on the parameter. When the connection is not marked as one-way and the device performing the routine is not in a server pool, the routine determines whether the device is an edge proxy and the request message being evaluated originated at a client or forwarding proxy. If that is the case, the routine may add header fields and parameters similar to those added when the connection is marked as one-way, so that subsequent messages are routed through the same edge proxy. Otherwise, the routine may add the server's FQDN to a Record-Route header field. If the device is an edge proxy, the device may add a FQDN that can be resolved by the device to which the message will be forwarded. After adding these header fields, the routine may additionally add a parameter reversing the server's role (e.g., From to To or vice versa) if the opposite parameter was previously stored.

At block 712, the routine removes the topmost Via header field. At block 714, the routine forwards the response. If the outgoing connection is trusted for routing (e.g., because it is using TLS or some other mechanism that enables private communications, or is indicated to be trusted by an administrator), the routine determines whether the connection is to a federated domain. If the connection is to a federated domain, the routine digitally signs header fields containing Record-Route and contact information. The routine also signs these header fields if the outgoing connection is not trusted for routing. The routine then forwards the response to the next entity in the response's route. At block 716, the routine returns to its caller.

The computing device on which the system for efficiently routing messages is implemented may include a central processing unit, memory, input devices (e.g., keyboard and pointing devices), output devices (e.g., display devices), and storage devices (e.g., disk drives). The memory and storage devices are computer-readable media that may contain instructions that implement the security system. In addition, the data structures and message structures may be stored or transmitted via a data transmission medium, such as a signal on a communications link. Various communications links may be used, such as the Internet, a local area network, a wide area network, or a point-to-point dial-up connection.

FIGS. 1 and 2 illustrate an example of a suitable operating environment in which the security may be implemented. The operating environment is only one example of a suitable operating environment and is not intended to suggest any limitation as to the scope of use or functionality of the extensible wireless framework. Other well-known computing systems, environments, and configurations that may be suitable for use include personal computers, server computers, handheld or laptop devices, multiprocessor systems, microprocessor-based systems, programmable consumer electronics, network PCs, minicomputers, mainframe computers, distributed computing environments that include any of the above systems or devices, and the like.

The security system may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method performed by a computer system for efficiently routing messages to a front end server of a server pool, the server pool comprising multiple front end servers, the method comprising:
   receiving a first message from a client computing device indicating to open a dialog, the first message sent to a domain name identifying the server pool;
   selecting a front end server of the server pool, the front end server having a server domain name;
   modifying a header field of the first message to add an indication of the server domain name of the selected front end server in the header field so that each subsequent message of the dialog is sent to the selected front end server based on the indication of the server domain name;
   adding a header field value indicating a role for the front end server, wherein the role is either From or To, wherein a From front end server is a server in a server pool of a sender of the first message and a To front end server is a server in a server pool of a recipient of the first message, wherein an application is configured to perform processing based on the indicated role;
   forwarding the modified first message to the selected front end server to open the dialog between the client computing device and the selected front end server;
   receiving subsequent messages of the dialog from the client computing device;
   detecting the selected front end server only from the indication of the server domain name contained in a header field of the subsequent messages; and
   forwarding the subsequent messages to the selected front end server based on the indication of the server domain name contained in the header field of the subsequent messages, wherein a first path the first message transits to the selected front end server is different from a second path the subsequent messages transit to the selected front end server.

2. The method of claim 1 wherein the computer system is a proxy server.

3. The method of claim 1 wherein subsequent messages of the dialog are exchanged between the client computing device and the selected front end server without forwarding by another computing device of the server pool.

4. The method of claim 3 wherein the computer system is another computing device of the server pool.

5. The method of claim 1 wherein the modifying includes adding a parameter to a header field.

6. The method of claim 5 wherein the header field is a Session Initiation Protocol Record-Route header field.

7. The method of claim 5 wherein the parameter indicates the server domain name.

8. The method of claim 7 wherein the server domain name is a fully qualified domain name.

9. The method of claim 1 including selecting an alternate front end server of the server pool when the selected front end server of the server pool becomes unavailable.

10. The method of claim 1 wherein the selecting includes determining a server load.

11. The method of claim 1 wherein the first message is a Session Initiation Protocol message.

12. A system for efficiently routing messages to a front end server of a server pool, the server pool comprising multiple front end servers, comprising:
   a processor;
   a memory containing computer-executable instructions for performing functions of components, the components including:
      a component that receives a first message from a client computing device indicating to open a dialog, the first message sent to a domain name identifying the server pool;
      a component that selects a front end server of the server pool, the front end server having an identifier;
      a component that modifies the first message by adding an indication of the identifier of the selected front end server to a header field of the first message without specifying a complete path for subsequent messages, wherein each subsequent message of the dialog is sent to the selected front end server based on the indication, wherein the indication indicates a role for the front end server, wherein the role is either From or To, wherein a From front end server is a server in a server pool of a sender of the first message and a To front end server is a server in a server pool of a recipient of the first message, wherein an application is configured to perform processing based on the indicated role; and
      a component that receives subsequent messages from the client computing device and forwards each subsequent message to the front end server indicated in the header field of the subsequent message, wherein the component is configured to identify the front end server from only the header field and without performing a lookup in a data source other than the header field of the subsequent message.

13. The system of claim 12 wherein the first message is a Session Initiation Protocol message.

14. The system of claim 12 wherein the identifier is a server domain name of the selected front end server.

15. The system of claim 14 wherein the server domain name is a fully qualified domain name.

16. The system of claim 12 including a component that forwards the modified first message to the selected front end server to open the dialog between the client computing device and the selected front end server.

17. The system of claim 12 wherein the component that receives the first message from the client computing device indicating to open the dialog operates at a first computing device and a component that does not receive the first message, but receives subsequent messages from the client computing device and forwards each subsequent message to the front end server indicated in the header field of the subsequent message operates at a second computing device, wherein the first computing device and the second computing device are not the same computing device.

18. The system of claim 17 wherein each of the first and second computing devices is an edge server.

19. A computer-readable storage device whose contents, when executed by a computer system, cause the computing system to perform a method comprising:
   receiving a message from a client computing device indicating to open a dialog, the message indicating a domain name identifying a server pool;

selecting a front end server of the pool, the front end server having an identifier;

modifying a header field of the message to add an indication of the identifier of the selected front end server so that subsequent messages of the dialog can be sent to the selected front end server based on the identifier;

adding a header field value indicating a role for the front end server, wherein the role is either From or To, wherein a From front end server is a server in a server pool of a sender of the first message and a To front end server is a server in a server pool of a recipient of the first message, wherein an application is configured to perform processing based on the indicated role;

forwarding the modified message to the selected front end server to open the dialog between the client computing device and the selected front end server;

receiving subsequent messages of the dialog from the client computing device;

detecting the selected front end server only from the indicator of the selected front end server contained in a header field of the subsequent messages without looking up the front end server from a data source other than the header field of the subsequent messages; and forwarding the subsequent messages to the selected front end server based on the indicator of the front end server contained in the header field of subsequent messages.

20. The computer-readable storage device of claim 19 wherein subsequent messages of the dialog are exchanged between the client computing device and selected front end server without forwarding by another computing device of the server pool.

21. The computer-readable storage device of claim 19 wherein the message is a Session Initiation Protocol message.

22. The computer-readable storage device of claim 19 wherein the identifier of the front end server is a domain name.

23. The computer-readable storage device of claim 22 wherein the domain name identifying the server pool is a fully qualified domain name.

24. The computer-readable storage device of claim 19 wherein the identifier of the front end server is a server name.

25. The computer-readable storage device of claim 19 wherein the identifier of the front end server is unique to the server pool.

26. A computer-readable storage device for indicating a front end server of a server pool, comprising:

a subsequent message containing a header field, wherein the header field identifies the server pool, the server pool comprising at least a front end server, and the subsequent message not specifying a complete path to the front end server, the complete path specifying multiple computing devices between a sender of the subsequent message and the front end server;

a header field value indicating a role for the front end server, wherein the role is either From or To, wherein a From front end server is a server in a server pool of a sender of the first message and a To front end server is a server in a server pool of a recipient of the first message, wherein an application is configured to perform processing based on the indicated role;

a parameter for the header field indicating the front end server, wherein the parameter remains constant during a dialog so that messages in the dialog transit the front end server indicated by the parameter; and instructions specifying a component that determines which front end server in the server pool to forward the subsequent message to based on the set parameter without looking up the front end server in a data source other than the header field of the subsequent message.

27. The computer-readable storage device of claim 26 wherein the identification of the server pool is a fully qualified domain name.

28. The computer-readable storage device of claim 27 wherein the parameter identifies a domain name of the front end server as a fully qualified domain name.

29. The computer-readable storage device of claim 26 wherein the parameter is a domain name of the front end server.

30. The computer-readable storage device of claim 29 wherein the domain name is a fully qualified domain name.

31. The computer-readable storage device of claim 26 wherein the parameter uniquely identifies the front end server in the server pool.

* * * * *